(12) United States Patent
Suga et al.

(10) Patent No.: US 8,396,146 B2
(45) Date of Patent: Mar. 12, 2013

(54) WIRELESS COMMUNICATION MODEM

(75) Inventors: Masakazu Suga, Maebashi (JP); Hiroaki Saitou, Isesaki (JP); Masato Yoshii, Isesaki (JP)

(73) Assignee: Sanden Corporation, Gunma (JP)

( * ) Notice: Subject to any disclaimer, the term of this patent is extended or adjusted under 35 U.S.C. 154(b) by 290 days.

(21) Appl. No.: 12/677,475

(22) PCT Filed: Aug. 28, 2008

(86) PCT No.: PCT/JP2008/065435
§ 371 (c)(1),
(2), (4) Date: Mar. 10, 2010

(87) PCT Pub. No.: WO2009/034849
PCT Pub. Date: Mar. 19, 2009

(65) Prior Publication Data
US 2011/0007787 A1    Jan. 13, 2011

(30) Foreign Application Priority Data
Sep. 10, 2007   (JP) ................. 2007-233624

(51) Int. Cl.
*H04K 1/10* (2006.01)
*H04B 3/46* (2006.01)
*G06F 3/00* (2006.01)
(52) U.S. Cl. .................. 375/260; 375/226; 370/208
(58) Field of Classification Search .......... 375/260, 375/226; 370/208
See application file for complete search history.

(56) References Cited

U.S. PATENT DOCUMENTS

| 5,568,402 | A | * | 10/1996 | Gray et al. ............ 709/224 |
| 5,583,922 | A | * | 12/1996 | Davis et al. ............ 379/93.09 |
| 5,657,389 | A | * | 8/1997 | Houvener ............ 713/186 |
| 5,850,517 | A | | 12/1998 | Verkler et al. |
| 5,867,495 | A | * | 2/1999 | Elliott et al. ............ 370/352 |
| 5,894,479 | A | * | 4/1999 | Mohammed ............ 370/401 |
| 6,119,167 | A | | 9/2000 | Boyle et al. |
| 7,634,070 | B2 | * | 12/2009 | Olafsson et al. ............ 379/93.35 |
| 2001/0012270 | A1 | | 8/2001 | Godoroja |
| 2002/0032809 | A1 | * | 3/2002 | Bateman et al. ............ 710/5 |
| 2002/0099829 | A1 | * | 7/2002 | Richards et al. ............ 709/227 |
| 2003/0083062 | A1 | * | 5/2003 | Bartolome et al. ............ 455/426 |
| 2004/0252629 | A1 | * | 12/2004 | Hasegawa et al. ............ 370/208 |
| 2006/0146867 | A1 | * | 7/2006 | Lee et al. ............ 370/465 |
| 2006/0172704 | A1 | * | 8/2006 | Nishio et al. ............ 455/67.11 |
| 2009/0074045 | A1 | * | 3/2009 | Mudulodu et al. ............ 375/226 |

FOREIGN PATENT DOCUMENTS

| JP | 4-192746 | 7/1992 |
| JP | 6-164603 | 6/1994 |
| JP | 07-084308 | 3/1995 |
| JP | 2001-136201 | 5/2001 |
| JP | 2001-339464 | 12/2001 |
| JP | 2002-101473 | 4/2002 |
| JP | 2005-278027 | 10/2005 |

* cited by examiner

*Primary Examiner* — David C. Payne
*Assistant Examiner* — Sarah Hassan
(74) *Attorney, Agent, or Firm* — Cozen O'Connor

(57) ABSTRACT

A wireless communication modem (2) receives data (10) sent from a host device (4) in a nonprocedural manner, then subjects the received data (10) to protocol conversion, and transmits the converted data to a server (8) via a wireless communication network (6). The wireless communication modem (2) has an on-request transmission mode in which the data (10) is transmitted to the server (8) only when a connection from the server (8) to the wireless communication modem (2) is established.

2 Claims, 3 Drawing Sheets

WIRELESS COMMUNICATION MODEM

RELATED APPLICATIONS

This is a U.S. National Phase Application under 35 USC §371 of International Application PCT/JP2008/065435 filed on Aug. 28, 2008.

This application claims the priority of Japanese Patent Application No. 2007-233624 filed Sep. 10, 2007, the entire content of which is hereby incorporated by reference.

1. Technical Field

The present invention relates to wireless communication modems, and more particularly, to a wireless communication modem suited for use in receiving data that is sent from a host device in a nonprocedural manner.

2. Background Art

As an example of conventional wireless communication modems, a device has been known which converts geographical information measured by a host device, which is a GPS device, to place-name data and transmits the converted data at all times to a server, which is a relay station, via a wireless communication network (see, e.g., Japanese Patent No. 3291082).

In this conventional modem, however, the data sent from the host device in a nonprocedural manner is unconditionally transmitted to the server at all times, regardless of whether the data is needed by the server or not. Consequently, an enormous amount of data is transmitted across the wireless communication network, giving rise to a problem that the cost of wireless communication increases.

The host device could be modified or updated so as to send data to the modem only when the data is requested by the server.

It is not desirable, however, to modify or update the host device, because a user who owns the host device only and wishes to make use of the wireless communication system inclusive of the wireless communication modem is compelled to bear extra costs.

Further, where the host device already in service is modified or updated, the user has to temporarily stop collecting data at the time of introduction of the wireless communication system, hindering the collection of data by the user.

DISCLOSURE OF THE INVENTION

The present invention was created in view of the above circumstances, and an object thereof is to provide a wireless communication modem which permits an existing host device to be used and yet makes it possible to reduce the cost of wireless communication with ease.

To achieve the object, the present invention provides a wireless communication modem for receiving data sent from a host device in a nonprocedural manner, then subjecting the received data to protocol conversion, and transmitting the converted data to a server via a wireless communication network, wherein the wireless communication modem has an on-request transmission mode in which the data is transmitted to the server only when a connection from the server to the wireless communication modem is established.

With the above wireless communication modem, although the data is sent from the host device in a nonprocedural manner, the wireless communication modem can be made to transmit the data to the server only when the connection from the server to the wireless communication modem is established, that is, only when the data is requested by the server. It is therefore possible to restrict the amount of data transmitted via the wireless communication network, thereby greatly reducing the cost of wireless communication.

Further, even if the specification of the host device requires that data be output therefrom in a nonprocedural manner, it is unnecessary to update or modify the host device. Also, where the host device is installed anew, an inexpensive general-use device may be employed as the host device, making it possible to reduce the cost of equipment constituting the wireless communication system.

Furthermore, since the host device need not be updated or modified, the user can continue collecting the data when the wireless communication system is introduced by using the host device already in service, thus improving the serviceability relating to the collection and utilization of the data.

Preferably, the wireless communication modem comprises a data processor for processing the data sent from the host device in a nonprocedural manner, and when the on-request transmission mode is being selected but the connection from the server to the wireless communication modem is not established, the data processor performs a data discarding process for discarding the data.

With the wireless communication modem configured in this manner, even if the specification of the host device is such that the host device remains in a standby state or repeatedly transmits the data until the data is read at the destination, the wireless communication modem reads in the data without fail and then discards the data, without transmitting the data to the server. Accordingly, error or malfunction of the host device can be prevented, and also since the amount of data transmitted via the wireless communication network can be effectively reduced, the wireless communication cost can be reduced without fail.

Preferably, the wireless communication modem comprises a data processor for processing the data sent from the host device in a nonprocedural manner, and when the on-request transmission mode is being selected but the connection from the server to the wireless communication modem is not established, the data processor performs a data reception rejection process for rejecting reception of the data.

In this case, the wireless communication modem can be made so as not to receive the data from the outset, and thus where the specification of the host device is such that the host device remains in a standby state or repeatedly transmits the data until completion of transmission of the data is acknowledged by the destination, error or malfunction of the host device can be prevented. Also, since the amount of data transmitted via the wireless communication network can be effectively restricted, the wireless communication cost can be reduced without fail.

Preferably, the wireless communication modem has an unconditional transmission mode in which the data is unconditionally transmitted to the server regardless of whether the connection from the server to the wireless communication modem is established or not, and the wireless communication modem comprises mode switching means for selecting one of the unconditional transmission mode and the on-request transmission mode.

In this case, where the host device is capable of periodically transmitting data and also where the frequency of reception of the data by the server can be made substantially equal to the data transmission frequency of the host device, the unconditional transmission mode may be selected, whereby the server can automatically collect the necessary data at the necessary timing, thus improving the convenience associated with the use of the wireless communication modem.

BEST MODE OF CARRYING OUT THE INVENTION

A wireless communication modem 2 according to a first embodiment of the present invention will be described first with reference to the accompanying drawings.

Figure 1:
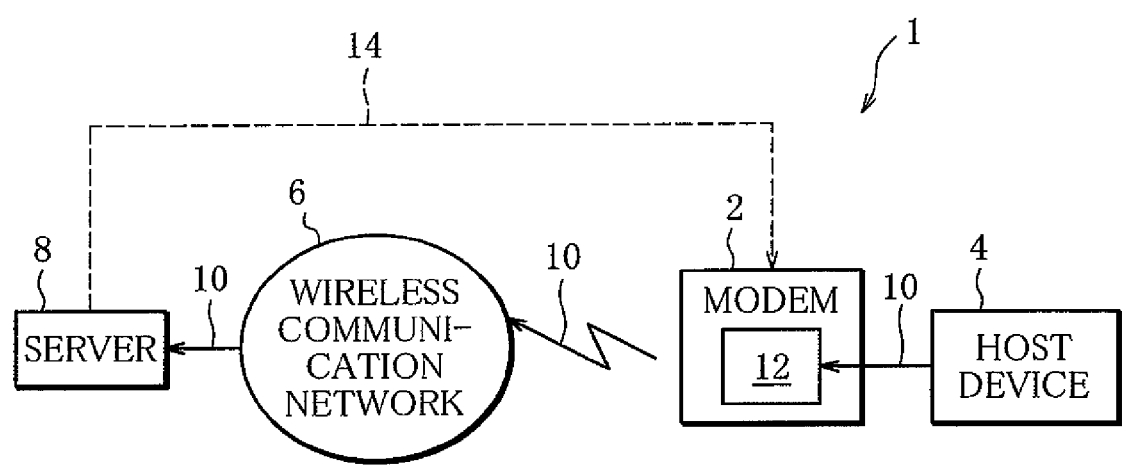
FIG. 1 illustrates a schematic configuration of a wireless communication system provided with a wireless communication modem according to a first embodiment of the present invention.

FIG. 1 schematically illustrates the configuration of a wireless communication system 1 using the modem 2. The wireless communication system 1 comprises a host device 4, the modem 2, a wireless communication network 6, and a server 8.

The host device 4 is a terminal device installed in a certain place and is connected to the modem 2 by wire. Specifically, the host device 4 is a GPS device for positioning purposes or the like, which is installed, for example, in a refrigerator car that travels in remote rural areas such as in the depths of the mountains. The host device 4 sends data 10, such as geographical information measured thereby, to the modem 2.

The host device 4 is connected with a computer or the like, not shown, directly by wire such that the data 10 can be collected continuously or periodically by means of serial communication based on RS-232C or the like. The data 10 is sent from the host device 4 to the modem 2 in a nonprocedural manner.

The modem 2 is a modulator including a data processor 12 for processing the data 10 and having a protocol conversion function. The modem 2 subjects the data 10 from the host device 4 to protocol conversion, to obtain data complying with a communication protocol used on the Internet, such as TCP/IP, and transmits the converted data 10 wirelessly to the wireless communication network 6.

The wireless communication network 6 is a packet communication network connected to the Internet via a gateway, not shown, for example, a wireless communication service network for mobile phones such as what is called the FOMA network or CDMA network. Packet communication is a communication method wherein the user is charged a communication fee calculated on the basis of the amount of data exchanged, namely, the number of packets.

The server 8 is a data center where the data 10 is collected via the wireless communication network 6, and constitutes a user accessible client-server system.

Thus, the measurement data 10 acquired by the host device 4 is sent to the modem 2 in a nonprocedural manner, and after subjecting the received data 10 to the protocol conversion, the modem 2 transmits the data 10 to the server 8 via the wireless communication network 6. This enables the user at the data center to collect and monitor, on a real-time basis, the data 10 measured at a remote location.

The modem 2 of this embodiment has an unconditional transmission mode in which the received data 10 is unconditionally transmitted to the server 8, and an on-request transmission mode in which the data 10 is transmitted to the server 8 only when a request signal 14 is received from the server 8.

The request signal 14 is conveyed, for example, by a short mail managed by a short message service that permits a short message of text to be exchanged between mobile phones. The request signal 14 addressed to the modem 2 is transmitted from the server 8, whereby the modem 2 can be remotely controlled in accordance with the instructions from the server 8.

The modem 2 is provided with a manually operated mode selection switch, not shown, for selecting either of the unconditional transmission mode and the on-request transmission mode. When the modem 2 is installed in a given place, the on-request transmission mode may be previously selected, so that the user can collect the data 10 only at the necessary timing from the location of the server 8 distant from the modem 2.

The data 10 is continuously or periodically sent from the host device 4 to the modem 2 in a nonprocedural manner, as stated above. Thus, when the on-request transmission mode is being selected in the modem 2 but the request signal 14 is not received, the data processor 12 executes a process for handling the unnecessary data 10.

Figure 2:
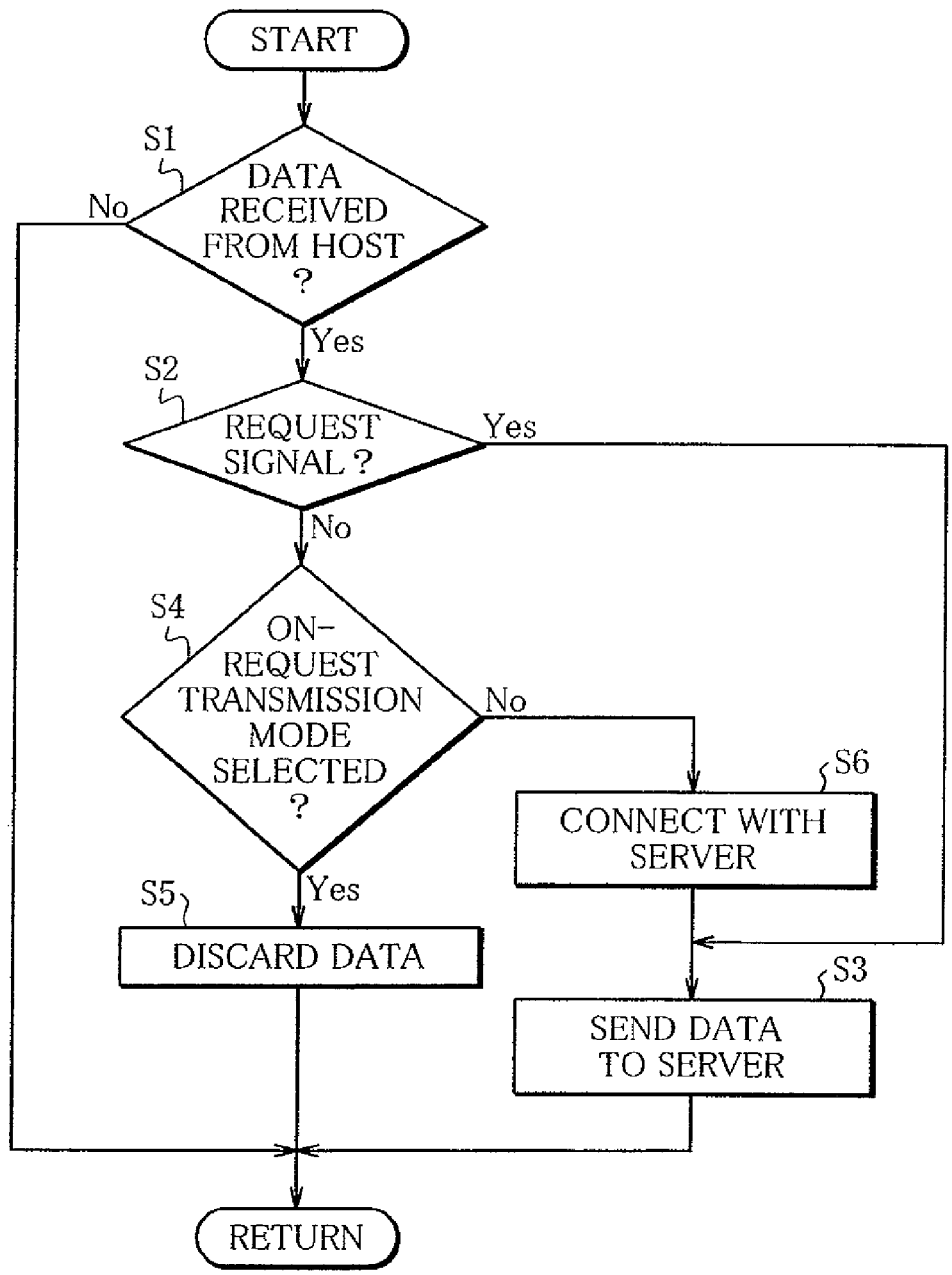
FIG. 2 is a flowchart illustrating a data processing control routine according to the first embodiment of the present invention, executed by a data processor shown in FIG. 1.

Referring now to the flowchart of FIG. 2, the data processing control routine executed by the data processor 12 will be explained.

Upon start of the control routine, it is determined first whether the data 10 has been received from the host device 4 or not in S1 ("S" represents step, and this applies to the following description). If the result of the decision is "true" (Yes), that is, if it is judged that the data 10 has been received from the host device 4, the routine proceeds to S2. On the other hand, if the result of the decision is "false" (No), that is, if it is judged that the data 10 has not been received from the host device 4, the control routine ends.

In S2, it is determined whether or not the request signal 14 has been received. If the result of the decision is "true" (Yes), that is, if it is judged that the request signal 14 has been received, the routine proceeds to S3. On the other hand, if the result of the decision is "false" (No), that is, if it is judged that the request signal 14 has not been received, the routine proceeds to S4.

In S3, the data 10 is transmitted to the server 8, whereupon the control routine ends.

In S4, it is determined whether or not the currently selected mode is the on-request transmission mode. If the result of the decision is "true" (Yes), that is, if it is judged that the on-request transmission mode is selected, the routine proceeds to S5. On the other hand, if the result of the decision is "false" (No), that is, if it is judged that the on-request transmission mode is not selected, namely, the unconditional transmission mode is selected, the routine proceeds to S6.

In S5, the data 10 received from the host device 4 is read in the modem 2 and then discarded without being transmitted to the server 8 (data discarding process), whereupon the control routine ends.

In S6, the modem 2 is connected to the server 8 via the wireless communication network 6, and then in S3, the data 10 is transmitted to the server 8, whereupon the control routine ends.

In this manner, when the on-request transmission mode is being selected but the request signal 14 is not received, the data processor 12 executes the data discarding process. Consequently, although the data 10 is received by the modem 2, the data 10 is discarded and is not transmitted to the wireless communication network 6, namely, the server 8.

As described above, in this embodiment, the timing for collecting the necessary data 10 is determined by the server 8, and the modem 2 is configured to operate in either the unconditional transmission mode or the on-request transmission mode in which the data 10 received from the host device 4 is transmitted to the server 8 only when the request signal 14 is received from the server 8. Accordingly, although the data 10 is sent from the host device 4 to the modem 2 in a nonprocedural manner, the data 10 can be transmitted from the modem 2 to the server 8 only when requested by the server 8. This makes it possible to restrict the amount of the data 10 transmitted via the wireless communication network 6, greatly reducing the cost of wireless communication.

Further, even if the specification of the host device 4 requires that the data 10 be output therefrom only in a nonprocedural manner, the host device 4 need not be modified or updated. Also, where the host device 4 is installed anew, an inexpensive general-use device can be used as the host device 4, making it possible to reduce the cost of equipment constituting the system 1.

Furthermore, since it is unnecessary to modify or update the host device 4, the user can continue collecting the data 10 even in the case where the system 1 is introduced by using the existing host device 4 already in service, thus improving the serviceability relating to the collection and utilization of the data 10.

Moreover, the modem 2 is provided with the mode selection switch for switching the transmission mode between the on-request transmission mode and the unconditional transmission mode. Accordingly, where the specification of the host device 4 permits periodic transmission of the data 10 and also if the frequency of reception of the data 10 by the server 8 can be made almost equal to the frequency of transmission of the data 10 from the host device 4, the unconditional transmission mode may be selected. In this case, the user can automatically collect the necessary data at the necessary timing, improving the convenience associated with the use of the modem 2.

Especially, in this embodiment, the data processor 12 executes the data discarding process, that is, discards the data 10 when the on-request transmission mode is being selected but the request signal 14 is not received. Thus, even in the case where the specification of the host device 4 is such that the host device 4 remains in a standby state or repeatedly transmits the data 10 until the data 10 is read at the destination, the modem 2 reads in the data 10 without fail and then discards the data 10, without transmitting the data 10 to the server 8. It is therefore possible to prevent error or malfunction of the host device 4 and also to effectively restrict the amount of the data 10 transmitted over the wireless communication network 6, thereby infallibly reducing the wireless communication cost.

A second embodiment will be now described.

In the second embodiment, a process of rejecting reception of the data is executed as the data processing control, in place of the data discarding process executed in the first embodiment. In other respects, the configuration of the second embodiment is identical with that of the first embodiment, and therefore, the following description is focused on the differences between the first and second embodiments.

Figure 3:
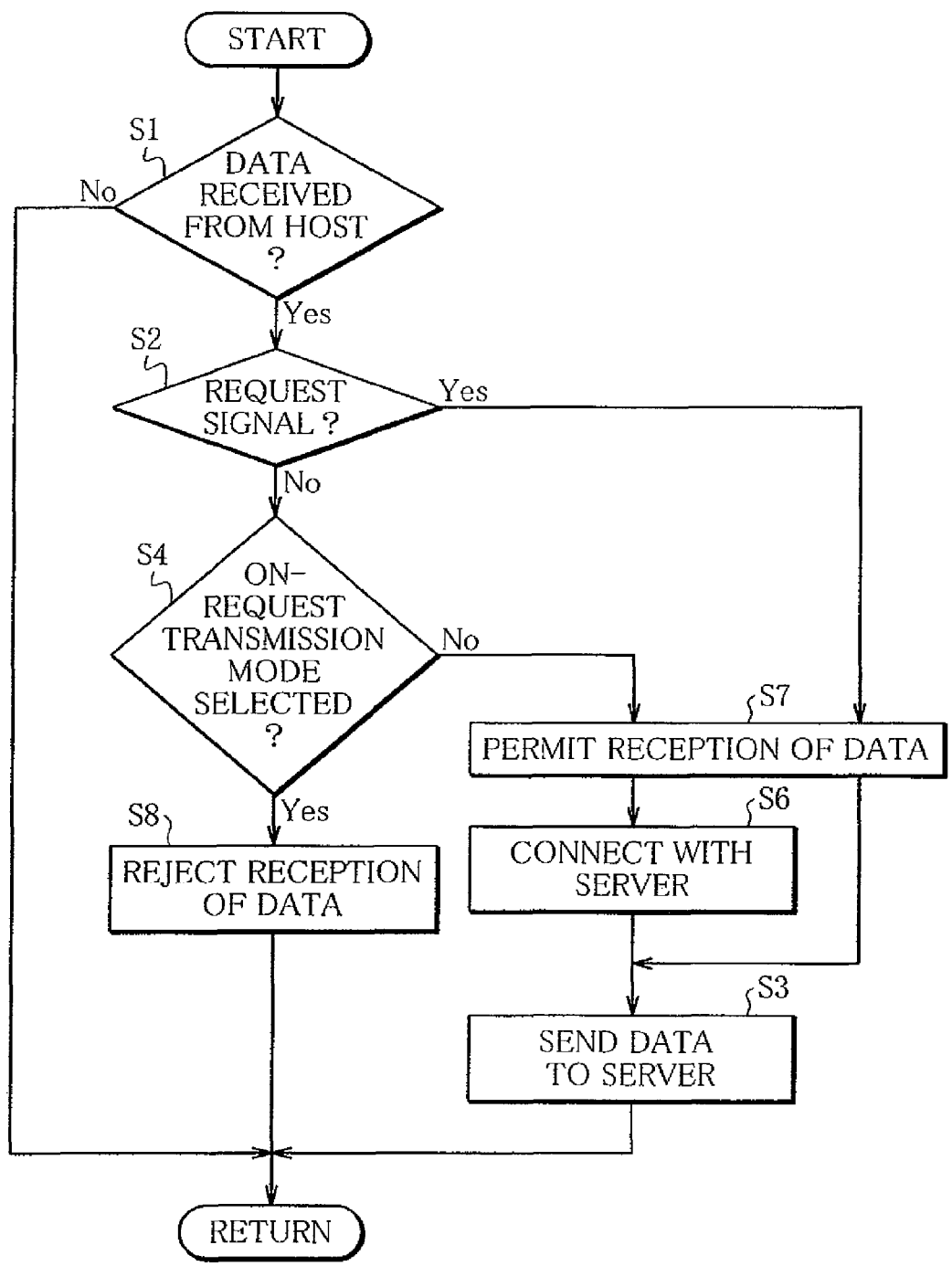
FIG. 3 is a flowchart illustrating a data processing control routine according to a second embodiment of the present invention, executed by the data processor shown in FIG. 1.

Referring to the flowchart of FIG. 3, a data processing control routine including the data reception rejection process will be now explained. The following explanation is directed mainly to Steps S7 and S8, which differ from the flowchart of FIG. 2.

If, after the start of the control routine, the result of the decision in S2 is found to be "true" (Yes), that is, if it is judged that the request signal 14 has been received, the routine proceeds to S7. On the other hand, if the result of the decision is "false" (No), that is, if it is judged that the request signal 14 has not been received, the routine proceeds to S4.

In S7, reception of the data 10 sent from the host device 4 is permitted, whereupon the routine proceeds to S3.

If the result of the decision in S4 is "true" (Yes), that is, if it is judged that the on-request transmission mode is selected, the routine proceeds to S8. On the other hand, if the result of the decision is "false" (No), that is, if it is judged that the unconditional transmission mode is selected, the routine proceeds to S7 and then to S6.

In S8, the data processor 12 executes the process of rejecting reception of the data 10 sent from the host device 4 (data reception rejection process), whereupon the control routine ends.

Thus, when the on-request transmission mode is being selected but the request signal 14 is not received, the data reception rejection process is executed by the data processor 12, so that the data 10 is not received by the modem 2 and therefore is not transmitted to the wireless communication network 6, namely, the server 8.

Also in the system 1 of the second embodiment, the cost of wireless communication via the wireless communication network 6 can be greatly reduced, as in the first embodiment. It is also possible to reduce the cost of the system 1 and to improve the serviceability relating to the collection of the data 10 as well as the convenience associated with the use of the modem 2.

Particularly, in the second embodiment, when the on-request transmission mode is being selected but the request signal 14 is not received, the data processor 12 executes the data reception rejection process to reject reception of the data 10 sent from the host device 4. Thus, even in the case where the specification of the host device 4 is such that the host device 4 remains in a standby state or repeatedly transmits the data 10 until completion of transmission of the data 10 is acknowledged by the destination, the modem 2 can be made not to receive the data 10 from the outset, thus preventing error or malfunction of the host device 4.

Namely, in either of the above embodiments, the amount of the data 10 transmitted via the wireless communication network 6 can be effectively restricted, regardless of the specification of the host device 4. It is therefore possible to reliably reduce the cost of wireless communication over the wireless communication network 6, without the need to modify or update the existing host device 4 and also allowing the host device 4 already in service to continue acquiring the data 10.

While the embodiments of the present invention have been described above, it is to be noted that the present invention is not limited to the foregoing embodiments alone and may be modified in various ways without departing from the spirit and scope of the invention.

For example, in the above embodiments, the modem 2 is provided with the manual mode selection switch for switching the transmission mode between the unconditional transmission mode and the on-request transmission mode. The transmission mode has only to be switched when necessary, and the mode selection switch may be configured so that the user can remotely switch the transmission mode from the location of the server 8 by using, for example, the short message service which is also used to transmit the request signal 14 from the server 8. Alternatively, the modem 2 may be so configured as to be able to automatically recognize the specification of the host device 4 such that the mode selection switch automatically selects the transmission mode. Also in this case, it is possible to improve the convenience associated with the use of the modem 2.

Further, in the foregoing embodiments, the data 10 is transmitted to the server 8 only when the request signal 14 is received from the server 8. Alternatively, the data 10 may be transmitted to the server 8 when the server 8 is merely connected to the modem 2 by a suitable means of communication from the server 8 to the modem 2, such as the short message service, without regard to the request signal 14. Also in this case, the aforementioned advantageous effects can be achieved.

The foregoing description of the embodiments is based on the assumption that the wireless communication network 6 is constituted by a packet communication network, but the applicable communication network is of course not limited to the packet communication network alone and may be a wireless communication network 6 using some other communication method.

The invention claimed is:

1. A wireless communication modem for receiving data sent from a host device in a nonprocedural manner, then subjecting the received data to protocol conversion, and transmitting the converted data to a server via a wireless communication network,
    wherein the wireless communication modem has an on-request transmission mode in which the data is transmitted to the server only when a connection from the server to the wireless communication modem is established,
    wherein the wireless communication modem comprises a data processor for processing the data sent from the host device in a nonprocedural manner, and
    when the on-request transmission mode is being selected but the connection from the server to the wireless communication modem is not established, the data processor performs a data discarding process for discarding the data,
    the wireless communication modem has an unconditional transmission mode in which the data is unconditionally transmitted to the server regardless of whether the connection from the server to the wireless communication modem is established or not, and
    the wireless communication modem comprises mode switching means for selecting one of the unconditional transmission mode and the on-request transmission mode.

2. A wireless communication modem for receiving data sent from a host device in a nonprocedural manner, then subjecting the received data to protocol conversion, and transmitting the converted data to a server via a wireless communication network,
    wherein the wireless communication modem has an on-request transmission mode in which the data is transmitted to the server only when a connection from the server to the wireless communication modem is established,
    wherein the wireless communication modem comprises a data processor for processing the data sent from the host device in a nonprocedural manner, and
    when the on-request transmission mode is being selected but the connection from the server to the wireless communication modem is not established, the data processor performs a data reception rejection process for rejecting reception of the data,
    the wireless communication modem has an unconditional transmission mode in which the data is unconditionally transmitted to the server regardless of whether the connection from the server to the wireless communication modem is established or not, and
    the wireless communication modem comprises mode switching means for selecting one of the unconditional transmission mode and the on-request transmission mode.

* * * * *